(12) United States Patent
Warshavsky et al.

(10) Patent No.: US 8,973,106 B2
(45) Date of Patent: Mar. 3, 2015

(54) COMPUTER IMPLEMENTED METHODS AND APPARATUS FOR PROVIDING PERMISSIONS TO USERS IN AN ON-DEMAND SERVICE ENVIRONMENT

(71) Applicant: salesforce.com, inc., San Francisco, CA (US)

(72) Inventors: Alex Warshavsky, Walnut Creek, CA (US); Adam Torman, Oakland, CA (US); Bhumi Damania, San Francisco, CA (US); Carol Franger, Berkeley, CA (US); Doug Bitting, Pleasanton, CA (US); Jimmy Hua, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 50 days.

(21) Appl. No.: 13/886,848

(22) Filed: May 3, 2013

(65) Prior Publication Data

US 2013/0298202 A1 Nov. 7, 2013

Related U.S. Application Data

(60) Provisional application No. 61/642,343, filed on May 3, 2012.

(51) Int. Cl.
*H04L 9/32* (2006.01)
*H04L 29/06* (2006.01)

(52) U.S. Cl.
CPC .............. *H04L 63/10* (2013.01); *H04L 69/24* (2013.01); *H04L 63/104* (2013.01); *H04L 63/107* (2013.01); *H04L 63/20* (2013.01)
USPC ............................................................. 726/4

(58) Field of Classification Search
None
See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 5,983,227 | A | 11/1999 | Nazem et al. |
| 6,092,083 | A | 7/2000 | Brodersen et al. |
| 6,161,149 | A | 12/2000 | Achacoso et al. |
| 6,169,534 | B1 | 1/2001 | Raffel et al. |
| 6,178,425 | B1 | 1/2001 | Brodersen et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

*Primary Examiner* — David Le
(74) *Attorney, Agent, or Firm* — Weaver Austin Villeneuve & Sampson LLP

(57) ABSTRACT

Disclosed are methods, devices, and computer readable storage media for providing permissions to users in an on-demand service environment. A server receives criteria indicating characteristics of users and/or permission sets. Selected permission sets can be assigned to identified users. Data indicating the assignment of the permission sets can also be stored.

16 Claims, 11 Drawing Sheets

(56) References Cited

U.S. PATENT DOCUMENTS

| | | | |
|---|---|---|---|
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Assal et al. |
| 7,945,653 B2 | 5/2011 | Zuckerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,255,991 B1 * | 8/2012 | Hackborn et al. .............. 726/21 |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0005178 A1 * | 1/2003 | Hemsath ...................... 709/328 |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0039906 A1 * | 2/2004 | Oka et al. ...................... 713/156 |
| 2004/0117440 A1 * | 6/2004 | Singer et al. .................. 709/203 |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0210261 A1 * | 9/2005 | Kamperman et al. ........ 713/182 |
| 2008/0249972 A1 | 10/2008 | Dillon |
| 2009/0063415 A1 | 3/2009 | Chatfield et al. |
| 2009/0100342 A1 | 4/2009 | Jakobson |

(56) References Cited

U.S. PATENT DOCUMENTS

| | | |
|---|---|---|
| 2009/0177744 A1 | 7/2009 | Marlow et al. |
| 2009/0193171 A1* | 7/2009 | Ichikawa ..................... 710/316 |
| 2011/0246527 A1 | 10/2011 | Bitting et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |

* cited by examiner

US 8,973,106 B2

COMPUTER IMPLEMENTED METHODS AND APPARATUS FOR PROVIDING PERMISSIONS TO USERS IN AN ON-DEMAND SERVICE ENVIRONMENT

PRIORITY DATA

This patent document claims priority to and commonly assigned U.S. Provisional Patent Application No. 61/642,343, titled "Methods and Systems for Providing Permissions in an On-Demand Service Environment", by Torman et al., filed on May 3, 2012, which is hereby incorporated by reference in its entirety and for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This patent document relates generally to permissions, and more specifically, assigning permission allowing access to components of a system to users of cloud computing services.

BACKGROUND

"Cloud computing" services provide shared resources, software, and information to computers and other devices upon request. In cloud computing environments, software can be accessible over the Internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

Permissions to access services and systems can be manually provided in a cloud computing context. However, using conventional techniques, it is difficult to efficiently manage and assign permissions to a large amount of users. For example, different users may require different types and/or levels of permissions to various resources.

BRIEF DESCRIPTION OF THE DRAWINGS

The included drawings are for illustrative purposes and serve only to provide examples of possible structures and operations for the disclosed inventive systems, apparatus, methods and computer readable media for providing permissions. These drawings in no way limit any changes in form and detail that may be made by one skilled in the art without departing from the spirit and scope of the disclosed implementations.

DETAILED DESCRIPTION

Figure 1:
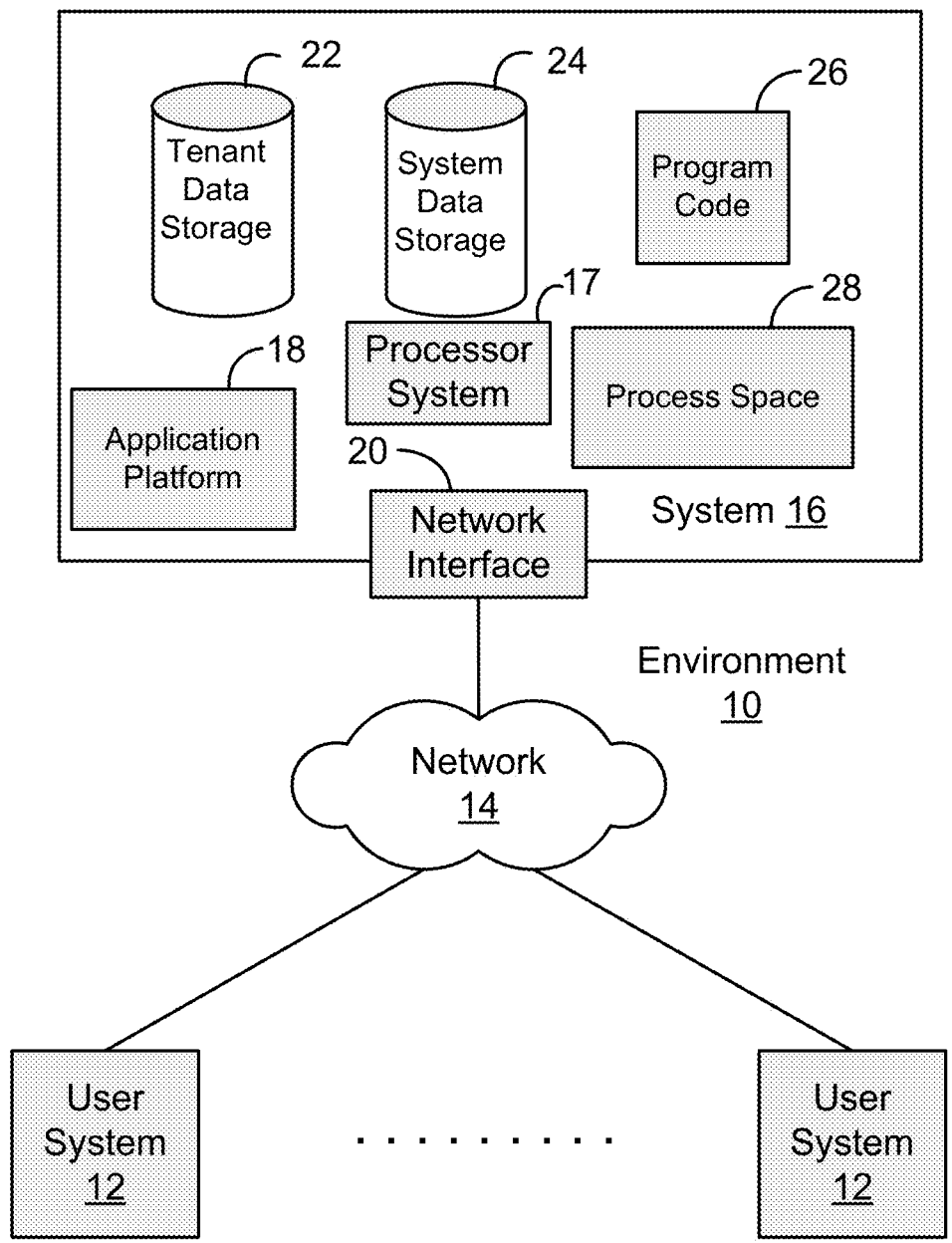
FIG. 1 shows a block diagram of an example of an environment 10 in which an on-demand database service can be used in accordance with some implementations.

Examples of systems, apparatus, and methods according to the disclosed implementations are described in this section. These examples are being provided solely to add context and aid in the understanding of the disclosed implementations. It will thus be apparent to one skilled in the art that implementations may be practiced without some or all of these specific details. In other instances, certain process/method operations, also referred to herein as "blocks," have not been described in detail in order to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the blocks of methods shown and described herein are not necessarily performed in the order indicated. It should also be understood that the methods may include more or fewer blocks than are indicated. In some implementations, blocks described herein as separate blocks may be combined. Conversely, what may be described herein as a single block may be implemented in multiple blocks.

Various implementations described or referenced herein are directed to different systems, apparatus, methods and computer-readable storage media for providing permissions that give access to computing resources such as data objects, components, and other entities of a system. In some examples, permissions can be managed and assigned via permission sets. Multiple permission sets may be assigned to a user of a system in order to grant access to a variety of resources. In some implementations, a permission set is structured as a container of permissions. The permission set can be assigned directly to a user, with the permissions layered to provide one or more rights needed to access computing resources in an on-demand database service environment including, but not exclusive of: objects, fields, pages, programmatic functions, identity service providers, and general functions.

For instance, users and permission sets may be assigned to each other based upon criteria. The assignments of users and permission sets may be stored in one or more databases of an on-demand database service environment. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. In this way, the users can gain access to components of a system.

The permission server may also analyze multiple permission sets that fit the criteria data. Certain permission sets may be preferred and assigned to a user. Accordingly, permissions may appear in multiple permission sets.

In some an on-demand database service environments, an Application Programming Interface (API) is configured to expose a collection of permissions and their assignments to users through appropriate network-based services and architectures, for instance, using Simple Object Access Protocol (SOAP) Web Service and Representational State Transfer (REST) APIs.

Some implementations of the disclosed techniques can allow developers to create advanced administrative tooling to reduce administrative time managing a user's rights, enable advanced reporting of a user's permissions through their permission set assignments, and allow developers to integrate master entitlement systems like Active Directory or Lightweight Directory Access Protocol (LDAP) services in an on-demand database service environment for the purpose of synchronizing a user's rights across multiple services and applications.

In some implementations, a permission set may be presented to an administrator as a container of permissions. However, each permission can reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes.

These and other implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to, magnetic media such as hard disks, floppy disks, and magnetic tape; optical media such as CD-ROM disks; magneto-optical media; and hardware devices that are specially configured to store program instructions, such as read-only memory ("ROM") devices and random access memory ("RAM") devices. These and other features of the disclosed implementations will be described in more detail below with reference to the associated drawings.

FIG. 1 shows a block diagram of an example of an environment 10 in which an on-demand database service can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

Environment 10 is an environment in which an on-demand database service exists. User system 12 may be implemented as any computing device(s) or other data processing apparatus such as a machine or system that is used by a user to access a database system 16. For example, any of user systems 12 can be a handheld computing device, a mobile phone, a laptop computer, a work station, and/or a network of such computing devices. As illustrated in FIG. 1 (and in more detail in FIG. 2) user systems 12 might interact via a network 14 with an on-demand database service, which is implemented in the example of FIG. 1 as database system 16.

An on-demand database service, implemented using system 16 by way of example, is a service that is made available to outside users, who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 1, implements a web-based customer relationship management (CRM) system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 2:
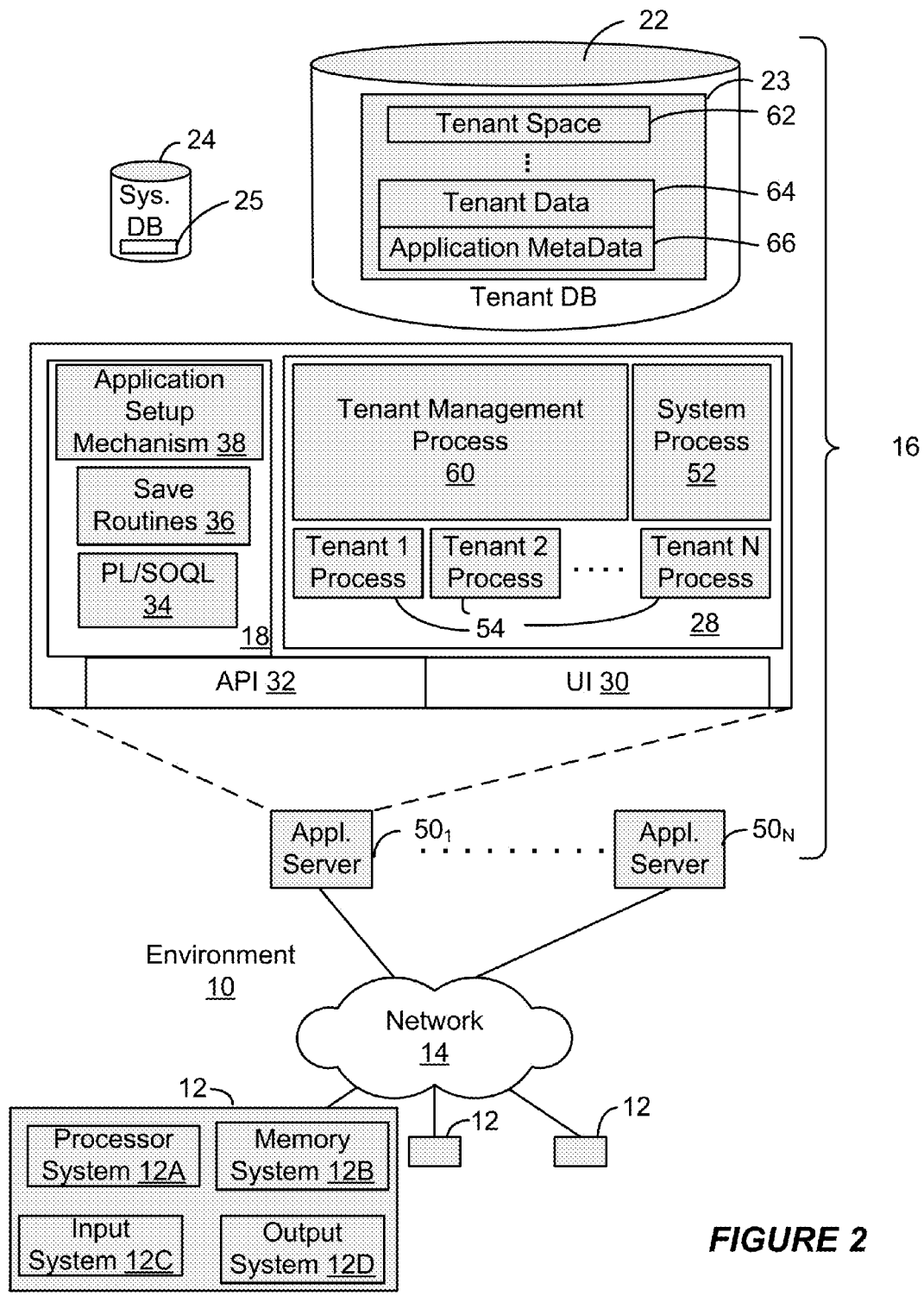
FIG. 2 shows a block diagram of an example of some implementations of elements of FIG. 1 and various possible interconnections between these elements.

One arrangement for elements of system 16 is shown in FIGS. 1 and 2, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, tablet, smartphone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a graphical user interface (GUI) provided by the browser on a display (e.g., a monitor screen, LCD display, etc.) of the computing device in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to a computing device or system, including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 2 shows a block diagram of an example of some implementations of elements of FIG. 1 and various possible interconnections between these elements. That is, FIG. 2 also illustrates environment 10. However, in FIG. 2 elements of system 16 and various interconnections in some implementations are further illustrated. FIG. 2 shows that user system 12 may include processor system 12A, memory system 12B, input system 12C, and output system 12D. FIG. 11B shows network 14 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 3A:
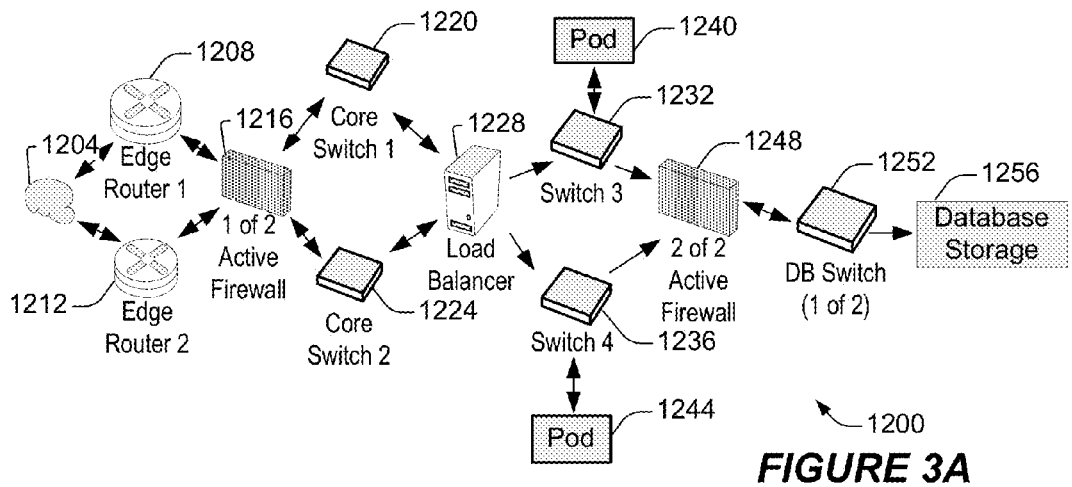
FIG. 3A shows a system diagram illustrating an example of architectural components of an on-demand database service environment 1200 according to some implementations.

FIG. 3A shows a system diagram illustrating an example of architectural components of an on-demand database service environment 1200 according to some implementations. A client machine located in the cloud 1204, generally referring to one or more networks in combination, as described herein, may communicate with the on-demand database service environment via one or more edge routers 1208 and 1212. A client machine can be any of the examples of user systems 12 described above. The edge routers may communicate with one or more core switches 1220 and 1224 via firewall 1216. The core switches may communicate with a load balancer 1228, which may distribute server load over different pods, such as the pods 1240 and 1244. The pods 1240 and 1244, which may each include one or more servers and/or other computing resources, may perform data processing and other operations used to provide on-demand services. Communication with the pods may be conducted via pod switches 1232 and 1236. Components of the on-demand database service environment may communicate with a database storage 1256 via a database firewall 1248 and a database switch 1252.

Figure 3B:
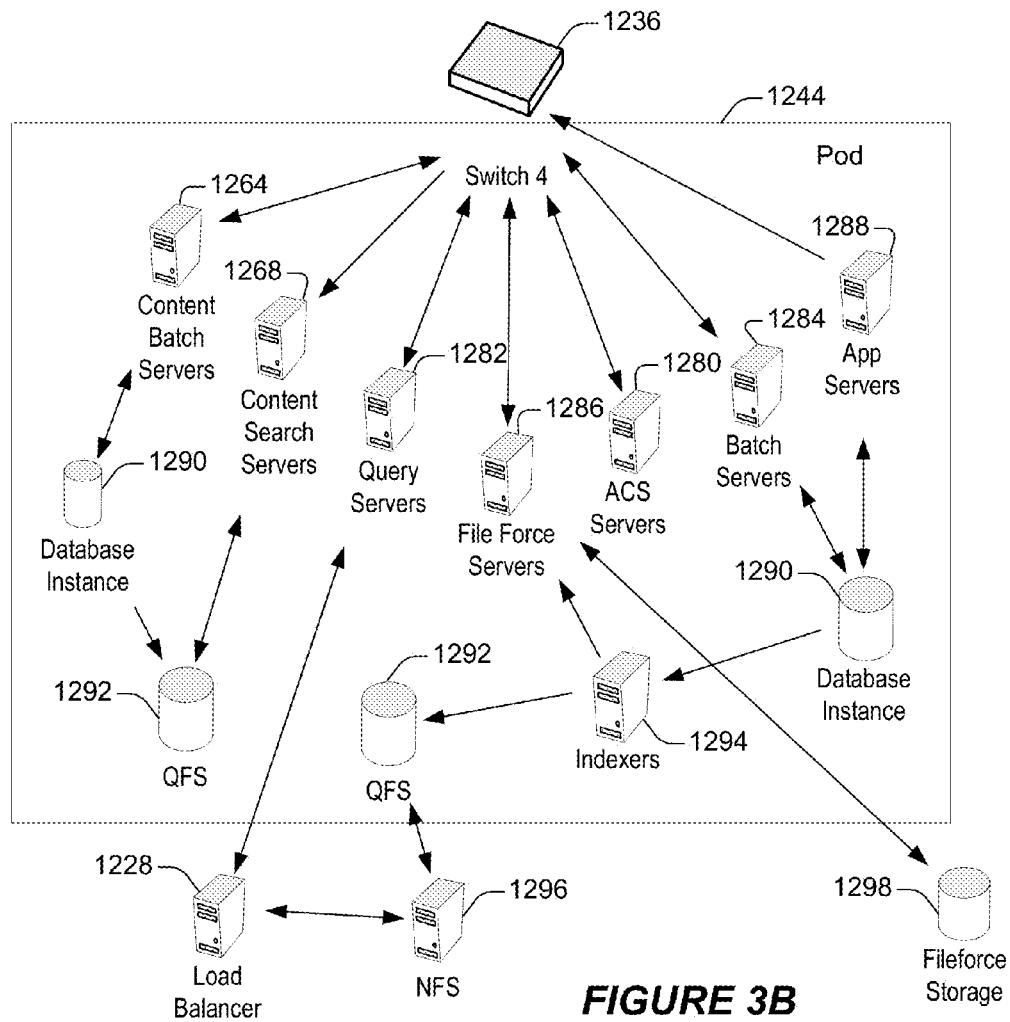
FIG. 3B shows a system diagram further illustrating an example of architectural components of an on-demand database service environment according to some implementations.

As shown in FIGS. 3A and 3B, accessing an on-demand database service environment may involve communications transmitted among a variety of different hardware and/or software components. Further, the on-demand database service environment 1200 is a simplified representation of an actual on-demand database service environment. For example, while only one or two devices of each type are shown in FIGS. 3A and 3B, some implementations of an on-demand database service environment may include anywhere from one to many devices of each type. Also, the on-demand database service environment need not include each device shown in FIGS. 3A and 3B, or may include additional devices not shown in FIGS. 3A and 3B.

Moreover, one or more of the devices in the on-demand database service environment 1200 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 1204 is intended to refer to a data network or plurality of data networks, often including the Internet. Client machines located in the cloud 1204 may communicate with the on-demand database service environment to access services provided by the on-demand database service environment. For example, client machines may access the on-demand database service environment to retrieve, store, edit, and/or process information.

In some implementations, the edge routers 1208 and 1212 route packets between the cloud 1204 and other components of the on-demand database service environment 1200. The edge routers 1208 and 1212 may employ the Border Gateway Protocol (BGP). The BGP is the core routing protocol of the Internet. The edge routers 1208 and 1212 may maintain a table of IP networks or 'prefixes', which designate network reachability among autonomous systems on the Internet.

In one or more implementations, the firewall 1216 may protect the inner components of the on-demand database service environment 1200 from Internet traffic. The firewall 1216 may block, permit, or deny access to the inner components of the on-demand database service environment 1200 based upon a set of rules and other criteria. The firewall 1216 may act as one or more of a packet filter, an application gateway, a stateful filter, a proxy server, or any other type of firewall.

In some implementations, the core switches 1220 and 1224 are high-capacity switches that transfer packets within the on-demand database service environment 1200. The core switches 1220 and 1224 may be configured as network bridges that quickly route data between different components within the on-demand database service environment. In some implementations, the use of two or more core switches 1220 and 1224 may provide redundancy and/or reduced latency.

In some implementations, the pods 1240 and 1244 may perform the core data processing and service functions provided by the on-demand database service environment. Each pod may include various types of hardware and/or software computing resources. An example of the pod architecture is discussed in greater detail with reference to FIG. 12B.

In some implementations, communication between the pods 1240 and 1244 may be conducted via the pod switches 1232 and 1236. The pod switches 1232 and 1236 may facilitate communication between the pods 1240 and 1244 and client machines located in the cloud 1204, for example via core switches 1220 and 1224. Also, the pod switches 1232 and 1236 may facilitate communication between the pods 1240 and 1244 and the database storage 1256.

In some implementations, the load balancer 1228 may distribute workload between the pods 1240 and 1244. Balancing the on-demand service requests between the pods may assist in improving the use of resources, increasing throughput, reducing response times, and/or reducing overhead. The load balancer 1228 may include multilayer switches to analyze and forward traffic.

In some implementations, access to the database storage 1256 may be guarded by a database firewall 1248. The database firewall 1248 may act as a computer application firewall operating at the database application layer of a protocol stack. The database firewall 1248 may protect the database storage 1256 from application attacks such as structure query language (SQL) injection, database rootkits, and unauthorized information disclosure.

In some implementations, the database firewall 1248 may include a host using one or more forms of reverse proxy services to proxy traffic before passing it to a gateway router. The database firewall 1248 may inspect the contents of database traffic and block certain content or database requests. The database firewall 1248 may work on the SQL application level atop the TCP/IP stack, managing applications' connection to the database or SQL management interfaces as well as intercepting and enforcing packets traveling to or from a database network or application interface.

In some implementations, communication with the database storage 1256 may be conducted via the database switch 1252. The multi-tenant database storage 1256 may include more than one hardware and/or software components for handling database queries. Accordingly, the database switch 1252 may direct database queries transmitted by other components of the on-demand database service environment (e.g., the pods 1240 and 1244) to the correct components within the database storage 1256.

In some implementations, the database storage 1256 is an on-demand database system shared by many different organizations. The on-demand database system may employ a multi-tenant approach, a virtualized approach, or any other type of database approach. An on-demand database system is discussed in greater detail with reference to FIGS. 1 and 2.

FIG. 3B shows a system diagram further illustrating an example of architectural components of an on-demand database service environment according to some implementations. The pod 1244 may be used to render services to a user of the on-demand database service environment 1200. In some implementations, each pod may include a variety of servers and/or other systems. The pod 1244 includes one or more content batch servers 1264, content search servers 1268, query servers 1282, file force servers 1286, access control system (ACS) servers 1280, batch servers 1284, and app servers 1288. Also, the pod 1244 includes database instances 1290, quick file systems (QFS) 1292, and indexers 1294. In one or more implementations, some or all communication between the servers in the pod 1244 may be transmitted via the switch 1236.

In some implementations, the app servers 1288 may include a hardware and/or software framework dedicated to the execution of procedures (e.g., programs, routines, scripts) for supporting the construction of applications provided by the on-demand database service environment 1200 via the pod 1244. In some implementations, the hardware and/or software framework of an app server 1288 is configured to execute operations of the services described herein, including performance of the blocks of methods described with reference to FIGS. 4-11. In alternative implementations, two or more app servers 1288 may be included and cooperate to perform such methods, or one or more other servers described herein can be configured to perform the disclosed methods.

The content batch servers 1264 may handle requests internal to the pod. These requests may be long-running and/or not tied to a particular customer. For example, the content batch servers 1264 may handle requests related to log mining, cleanup work, and maintenance tasks.

The content search servers 1268 may provide query and indexer functions. For example, the functions provided by the content search servers 1268 may allow users to search through content stored in the on-demand database service environment.

The file force servers 1286 may manage requests for information stored in the Fileforce storage 1298. The Fileforce storage 1298 may store information such as documents, images, and basic large objects (BLOBs). By managing requests for information using the file force servers 1286, the image footprint on the database may be reduced.

The query servers 1282 may be used to retrieve information from one or more file systems. For example, the query system 1282 may receive requests for information from the app servers 1288 and then transmit information queries to the NFS 1296 located outside the pod.

The pod 1244 may share a database instance 1290 configured as a multi-tenant environment in which different organizations share access to the same database. Additionally, services rendered by the pod 1244 may call upon various hardware and/or software resources. In some implementations, the ACS servers 1280 may control access to data, hardware resources, or software resources.

In some implementations, the batch servers 1284 may process batch jobs, which are used to run tasks at specified times. Thus, the batch servers 1284 may transmit instructions to other servers, such as the app servers 1288, to trigger the batch jobs.

In some implementations, the QFS 1292 may be an open source file system available from Sun Microsystems® of Santa Clara, Calif. The QFS may serve as a rapid-access file system for storing and accessing information available within the pod 1244. The QFS 1292 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 1268 and/or indexers 1294 to identify, retrieve, move, and/or update data stored in the network file systems 1296 and/or other storage systems.

In some implementations, one or more query servers 1282 may communicate with the NFS 1296 to retrieve and/or update information stored outside of the pod 1244. The NFS 1296 may allow servers located in the pod 1244 to access information to access files over a network in a manner similar to how local storage is accessed.

In some implementations, queries from the query servers 1222 may be transmitted to the NFS 1296 via the load balancer 1228, which may distribute resource requests over various resources available in the on-demand database service environment. The NFS 1296 may also communicate with the QFS 1292 to update the information stored on the NFS 1296 and/or to provide information to the QFS 1292 for use by servers located within the pod 1244.

In some implementations, the pod may include one or more database instances 1290. The database instance 1290 may transmit information to the QFS 1292. When information is transmitted to the QFS, it may be available for use by servers within the pod 1244 without using an additional database call.

In some implementations, database information may be transmitted to the indexer 1294. Indexer 1294 may provide an index of information available in the database 1290 and/or QFS 1292. The index information may be provided to file force servers 1286 and/or the QFS 1292.

As multiple users might be able to change the data of a record, it can be useful for certain users to be notified when a record is updated. Also, even if a user does not have authority to change a record, the user still might want to know when there is an update to the record. For example, a vendor may negotiate a new price with a salesperson of company X, where the salesperson is a user associated with tenant Y. As part of creating a new invoice or for accounting purposes, the salesperson can change the price saved in the database. It may be important for co-workers to know that the price has changed. The salesperson could send an email to certain people, but this is onerous and the salesperson might not email all of the people who need to know or want to know. Accordingly, some implementations of the disclosed techniques can inform others (e.g., co-workers) who want to know about an update to a record automatically.

The tracking and reporting of updates to a record stored in a database system can be facilitated with a multi-tenant database system 16, e.g., by one or more processors configured to receive or retrieve information, process the information, store results, and transmit the results. In other implementations, the tracking and reporting of updates to a record may be implemented at least partially with a single tenant database system.

Figure 4:
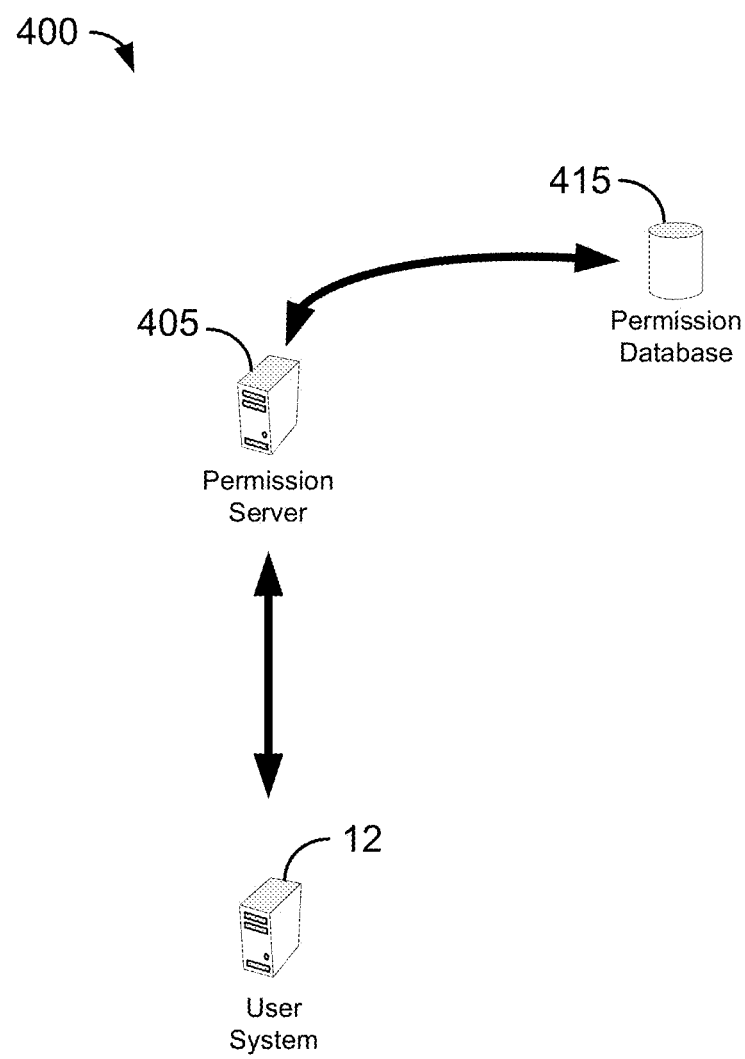
FIG. 4 shows a system diagram illustrating an example of architectural components 400 for assigning permission sets to users according to some implementations.

FIG. 4 shows a system diagram illustrating an example of architectural components 400 for assigning permission sets to users according to some implementations. Architectural components 400 in FIG. 4 may provide communications to be transmitted among a variety of different hardware and/or software components. For example, architectural components 400 may include user system 12, permission server 405, and permission database 415.

The various components are able to communicate with each other over the Internet or a combination of networks including the Internet. For example, in some implementations, user system 12 may communicate with permission server 405. Permission server 405 may further communicate with permission database 415. Accordingly, permission server 405 may process data received from user system 12, and access, analyze, and/or modify data stored in permission database 415. Permission server 405 may also transmit data from permission database 415 to user system 12.

For example, permission server 405 may receive data regarding criteria, such as a geographic location, a level with an organizational hierarchy, title, an industry, a role, and/or a permission. In some implementations, permission server 405 may query permission database 415 to select a permission set associated with the criteria received from user system 12. Permission server 405 may also identify users associated with the criteria. Accordingly, permission server 405 may assign the selected permission set to the identified users. As such, the users who have been assigned the permission set may obtain access rights to one or more components of a system whose access permissions may be managed by architectural components 400 of FIG. 4. In some implementations, permission server 405 may receive the criteria via an application programming interface (API).

Figure 5:
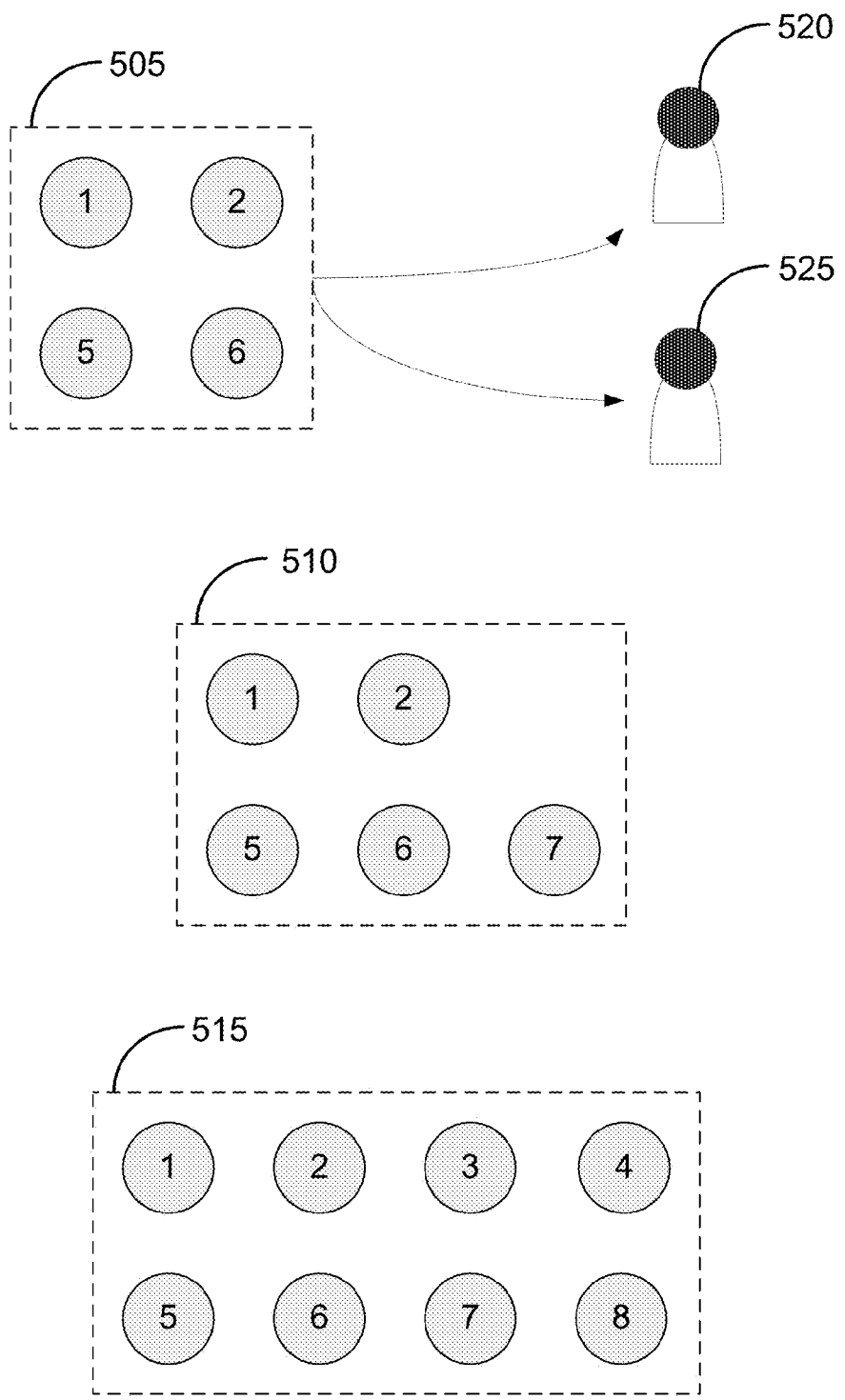
FIG. 5 shows a graphical representation of permission assignments to users using profiles, in accordance with some implementations.

FIG. 5 shows a graphical representation of permission assignments to users using profiles, in accordance with some implementations. In the implementation of FIG. 5, profiles 505, 510, and 515 include a variety of permissions 1-8. For example, profile 505 includes permissions 1, 2, 5, and 6. Profile 510 includes permissions 1, 2, 5, 6, and 7. Profile 515 includes permissions 1-8. Permissions may include an indication of access, and/or type of access, to a particular computing resource such as a component of a system.

Profiles 505, 510, and 515 may be assigned to a variety of users 520 and 525. For example, profile 505 may be a profile indicating a non-management employee within an organization, and therefore, includes permissions 1, 2, 5, and 6 to provide employees assigned to profile 505 with a level of access to components of a system. Components of a system may include databases, records, fields of records, customer relationship management (CRM) tools, objects, software, etc. For example, permission 1 may provide read access to a field of a database table. Permission 2 may provide access to a certain software program. Permission 5 may provide write capability to a particular field of a database table. Finally, permission 6 may provide access to a particular object. In some implementations, permissions may include create, read, update, and/or delete (CRUD) options. For example, a permission may only include a level of access associated with reading, for example, a field of a record. Another permission may include a level of access associated with reading and updating a field of a record.

Accordingly, users 520 and 525 may be assigned profile 505 and receive permissions 1, 2, 5, and 6. However, if user 525 is promoted to a management position, a system administrator may need to assign a new permission to user 525. For example, permission 7 may provide "view all data" access for a database. Accordingly, the system administrator may need to modify profile 505 to include permission 7. However, by modifying permission 505 with another permission, user 520 will also get permission 7. Therefore, the system administrator may create profile 510, a new type of profile for management employees which includes the same permissions as profile 505 for non-management employees (i.e., permissions 1, 2, 5, and 6) but also includes permission 7. User 525's profile may then be assigned to profile 510.

Additionally, the system administrator may wish to receive all permissions for the components of the system. As such, the system administrator may create a third profile, profile 515, which includes all permissions 1-8.

However, across an organization, different users needing different levels of access to different components of the system may create an unwieldy amount of user profiles for system administrators. A user needing an extra access control, such as management employee user 525 needing access to permission 7 (i.e., "view all data"), requires creating a new profile (i.e., profile 510) and subsequently removing the association between the old profile (i.e., profile 505) and user 525 and assigning the new profile even though profile 510 only includes one extra permission than profile 505. As such, the administrative work load for the system administrator may increase with a cumbersome assignment and multitude of profiles.

Figure 6:
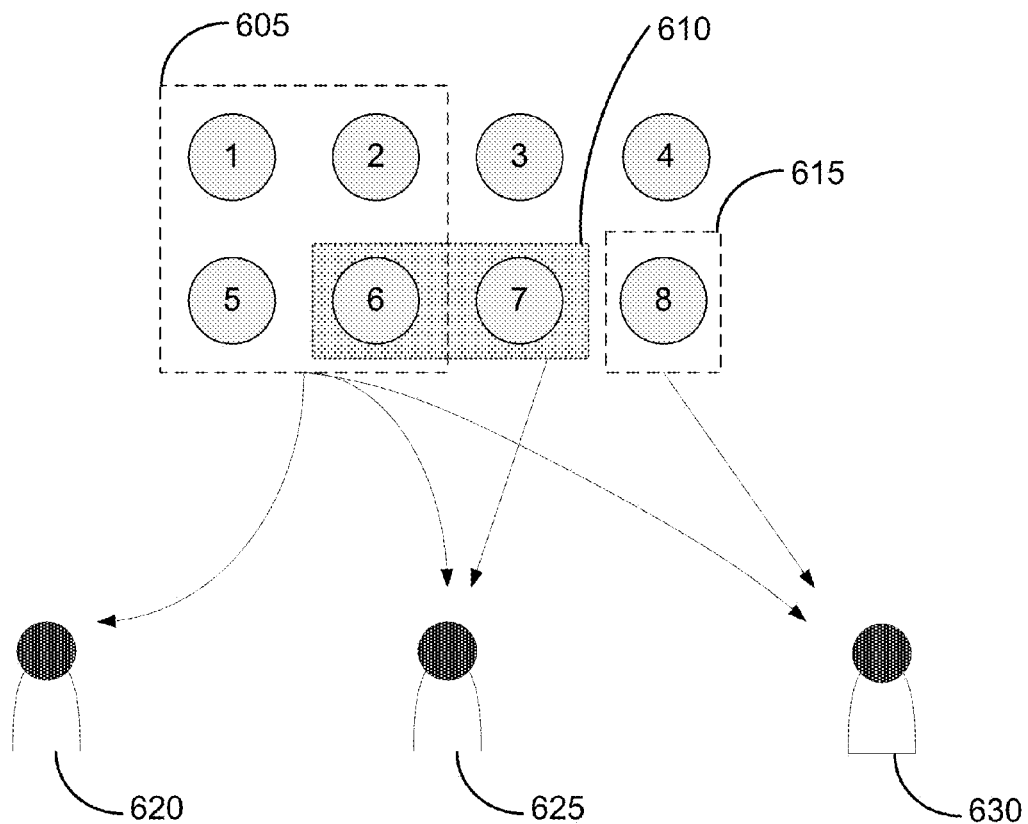
FIG. 6 shows a graphical representation of permissions assignments to users via permission sets, in accordance with some implementations.

FIG. 6 shows a graphical representation of permissions assignments to users via permission sets, in accordance with some implementations. In the implementation of FIG. 6, permission sets 605, 610, and 615 also include a variety of permissions 1-8. For example, permission set 605 includes permissions 1, 2, 5, and 6. Permission set 610 includes permissions 6 and 7. Permission set 615 includes permission 8. The permissions in the permission sets also may include an indication of access, and/or type of access, to particular components or features of a system.

Permission sets 605, 610, and 615 may also be assigned to a variety of users 620, 625, and 630. The permission sets may provide a more modular form of groupings of permissions than profiles. As such, a single user may be assigned multiple permission sets tailored to their particular access needs. For example, permission set 605 is assigned to users 620, 625, and 630. Permission set 610 may be assigned to user 625. Permission set 615 may be assigned to user 630.

In some implementations, users may be assigned both profiles and permission sets. Some permissions may be associated with a profile assigned to a user and some permissions may be associated with permission sets. In an implementation, some permissions may be allowed on both profiles and permission sets. Accordingly, some permissions may be enabled on a user's profile and/or assigned permission sets. Alternatively, some permissions may only be assigned to a user's profile rather than through a permission set, and vice versa. For example, as in FIG. 5, profiles may be associated with non-management employees, management employees, and system administrators. The profiles for the non-management and management employees may include a minimum or base amount of permissions. However, the employees may also be assigned permission sets based on the characteristics or attributes of the employees, as discussed below. As such, permission sets may add additional permissions beyond those found in a profile for a user.

In some implementations, the grouping of permissions into permission sets may be associated with criteria. Criteria may include a geographic location, a level within an organizational hierarchy (e.g., engineer, senior engineer, staff engineer, etc.; manager, senior manager, director, etc.), an industry, a role, level of experience or seniority, and other characteristics of users. For example, permission set 605 may be associated with "engineers." Permissions within permission set 605 (i.e., permissions 1, 2, 5, and 6) may provide a level of access to components needed for engineers. Accordingly, users 620, 625, and 630 may be assigned permission set 605 because the users are engineers.

Permission set 610 may be associated with a geographic location, such as a continent, region, state, city, etc. For example, permission set 610 may be associated with "California." As such, permission set 610 may include permissions allowing a level of access needed for employees within California (e.g., permission to edit data associated with business activity in California). In FIG. 6, user 625 is the only user assigned to permission set 610 because user 625 may be the only user within California, and therefore, the only user provided access to permission 7.

Permission set 615 may be associated with an industry, such as "aerospace." Accordingly, permission set 615 may be assigned to user 630 because user 630 may be an aerospace engineer, and therefore needs the permissions associated with "aerospace" (i.e., permission set 615) and "engineer" (i.e., permission set 605).

Additionally, an assignment of a permission set may be removed or revoked from a user. For example, as discussed above, user 625 may be assigned permission sets 605 (i.e., a permission set associated with "engineers") and 610 (i.e., a permission set associated with "California"). If user 625 transfers from California to Alabama, a system administrator may desire to revoke the assignment of permission set 610 to user 625.

In some implementations, revoking a permission set may not result in the revocation of a particular permission that exists in multiple permission sets. For example, in FIG. 6, permission 6 is associated with permission sets 605 and 610. If permission set 610 is revoked, but permission set 605 is maintained (i.e., not revoked), user 625 may still retain permission 6 because permission set 605 is still assigned and includes permission 6. Therefore, revoking permission set 610 may not necessarily affect the assignment of permission 6 to user 625 due to the assignment of permission set 610.

Figure 7:
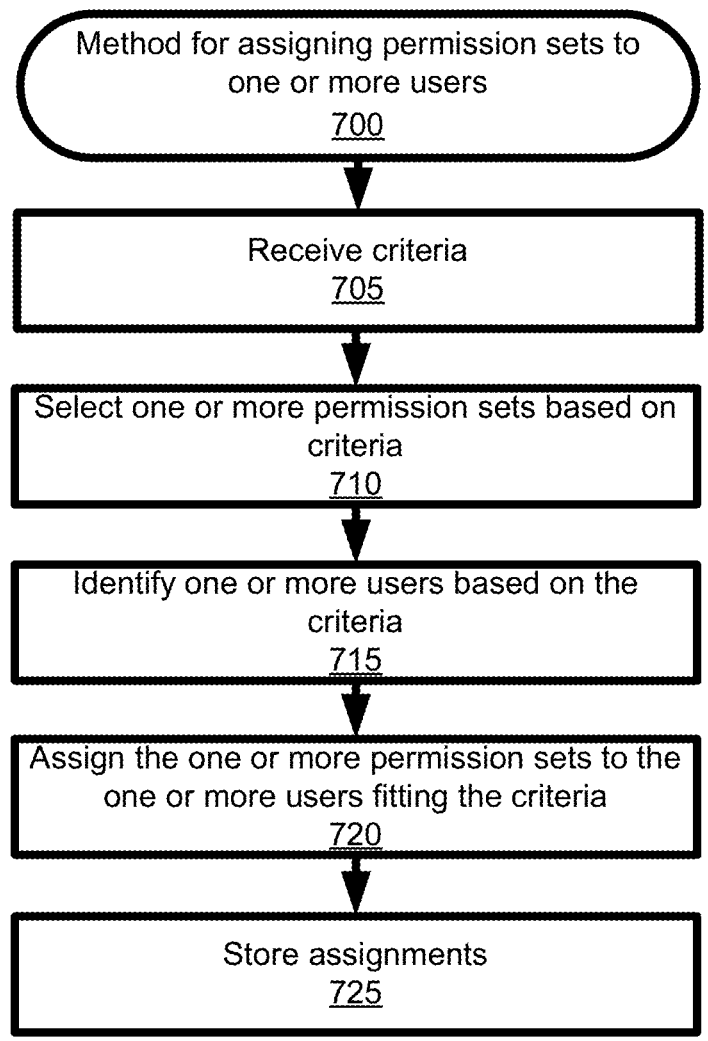
FIG. 7 shows a flowchart of an example of a computer implemented method 700 for assigning permission sets to one or more users in accordance with some implementations.

In some scenarios, a system administrator may desire to assign permission sets to users. FIG. 7 shows a flowchart of an example of a method 700 for assigning permission sets to one or more users. Method 700 (and other methods described herein) may be implemented by the architectural components of FIG. 4. In various implementations, blocks may be reordered, omitted, combined, or split into additional blocks for method 700, as well as other methods described herein.

In block 705, a server, such as permission server 405 of FIG. 4, receives criteria from a computing device such as user system 12. Criteria may include data such as a geographic location, a level with an organizational hierarchy, an industry, a role, and/or one or more permissions.

In block 710, one or more permission sets associated with the criteria may be selected. For example, as previously discussed with respect to FIG. 6, permission sets may be associated with characteristics of users. For example, an employee may be associated with criteria such as "California" and "engineer." Accordingly, permission sets associated with the received criteria may be selected.

Additionally, criteria may include a particular permission. In FIG. 6, permission 6 is shared among permission sets 605 and 610. Permission 6 may represent a level of access to a particular component of a system. For example, permission 6 may be associated with delete access to a particular field of a record.

In block 715, one or more users may be selected. For example, a selection of users may be received by permission server 405. In another example, the users may be identified by permission server 405 based on the criteria. For example, criteria can include "California," "engineer," and permission 6. Accordingly, users matching the criteria may be selected. That is, users with attributes matching "California" and "engineer" may be selected to be assigned to a permission set associated with permission 6. Users with attributes "California" and "engineer" may also be assigned permission sets with attributes "California" and "engineer."

In block 720, the permission sets may be assigned to the users. Accordingly, the users may gain access to particular components of a system.

In block 725, the assignments may be stored, for example, in a database. In some implementations, the assignments may be stored in a permission set assignment object. Additionally, the object may be stored in a database or other storage medium. As previously discussed, the permission set assignment object may include an identifier or identification for the user and permission set. In some implementations, the permission set assignment itself may also have an identifier.

Figure 8:
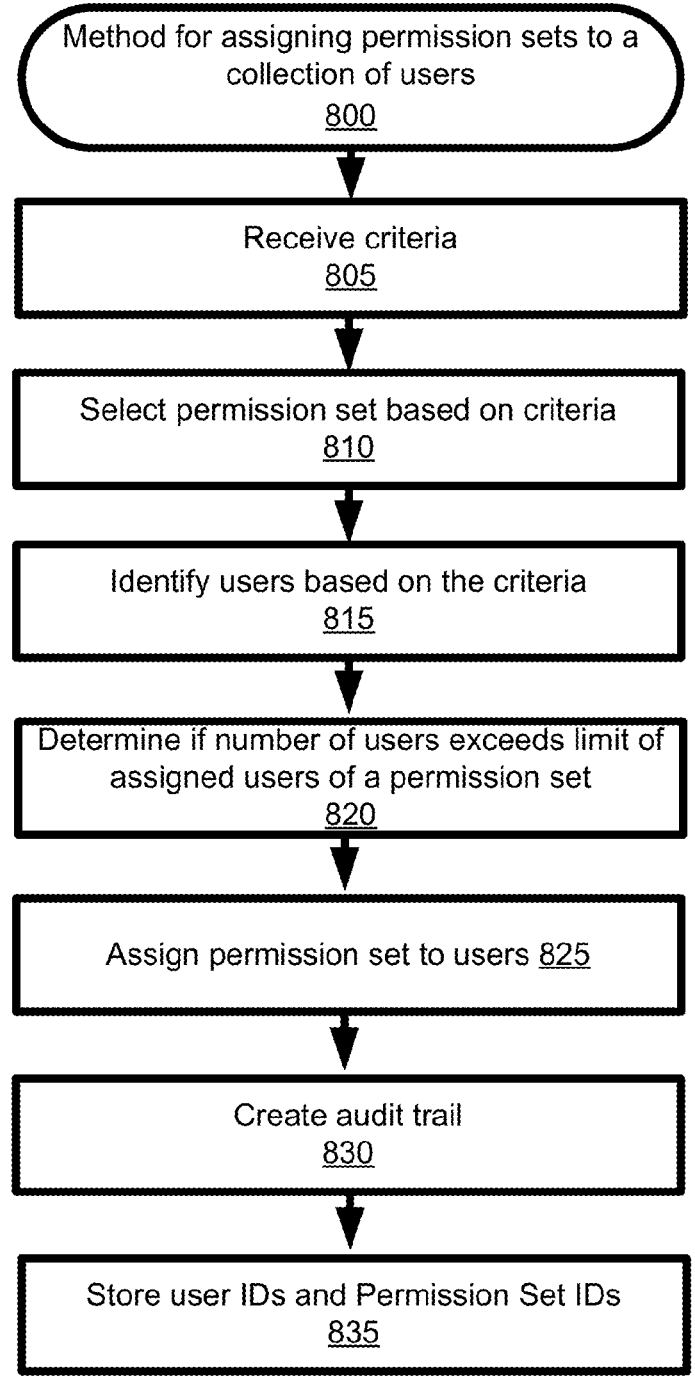
FIG. 8 shows a flowchart of an example of a computer implemented method 800 for assigning permission sets to one or more users in accordance with some implementations.

FIG. 8 shows a flowchart of an example of a method 800 for assigning permission sets to one or more users in accordance with some implementations.

In block 805, criteria may be received, as previously discussed with respect to block 705. In block 810, a permission set based on the criteria may be selected, as discussed in regard to block 710.

Additionally, in some implementations, all permission sets associated with the criteria may be selected. In other implementations, a subset of the identified permission sets matching the criteria may be selected. For example, only a single permission set may be selected to be assigned to users. Accordingly, permission sets may be analyzed to determine the selected permission set. Alternatively, the available permission sets may be provided to user system 12 and permission server 405 may receive an indication of a particular permission set to assign to a user.

In an implementation, the selected permission set may be determined based upon the permission set with the most or least amount of users assigned to it. For example, if permission 6 is received as criteria, then permission sets 605 or 610 may be selected. In an implementation, permission set 605 may be selected if the number of users it has been assigned to is lower than the number of users assigned to permission set 610. Alternatively, permission set 605 may be selected if the number of users it has been assigned to is higher than the number of users assigned to permission set 610.

In an implementation, the permission set with the least amount of permissions may be selected. For example, a permission set with two permissions may be selected over a permission set with three permissions. As such, the least amount of privileges or access may be provided to a user. Alternatively, the permission set with the highest amount of permissions may be selected.

In block 815, users based on the criteria may be identified, as discussed previously for block 715.

In block 820, the numbers of users identified may be used to determine to permission set to select to be assigned to the users. Permission sets may have a limit of users that they may be assigned to. For example, permission set 610 may have a maximum assignment limit of two users. If permission set 610 has already reached its limit of being assigned to two users, then the permission set may not be selected. That is, permission set 610 may be selected instead.

In block 825, permission sets may be assigned to users. In some implementations, all the users may be assigned the same permission set. Alternatively, users may be assigned different permission sets. For example, a subset of the users may be assigned a first permission set until the first permission set has reached its limit of users it may be assigned to. Accordingly, the rest of the users may be assigned to a second permission set that includes the desired permissions to be assigned to users.

In block 830, an audit trail may be created. In some implementations, an audit trail may be a recordation of the assignments (or removal of assignments) of permission sets, the included permissions, and users. Additionally, who made a change to a permission set or an assignment of a permission to a permission set and changes to may be recorded in the audit trail. The audit trial may be used by a system administrator to log activity of assignments of permission sets to users. In some implementations, the audit trail may also include data regarding the permission sets that were identified but not selected in block 810. The audit trail may also include the list of criteria received in block 805.

In block 835, user identifiers and permission set identifiers may be stored together to create a permission set assignment object. For example, an object including a user identifier associated with a user and a permission set identifier associated with the selected permission set in block 810 may be created. In some implementations, the object may be stored in a database or other storage medium. A record may be created for each intersection of a user and a permission set. The record may be stored as a row of a database table. For example, a first column of the database may include user identifiers and a second column may include permission set identifiers for the permission set assignment object. Accordingly, in some implementations, an assignment of every permission set to a user may include a permission set assignment object.

Figure 9:
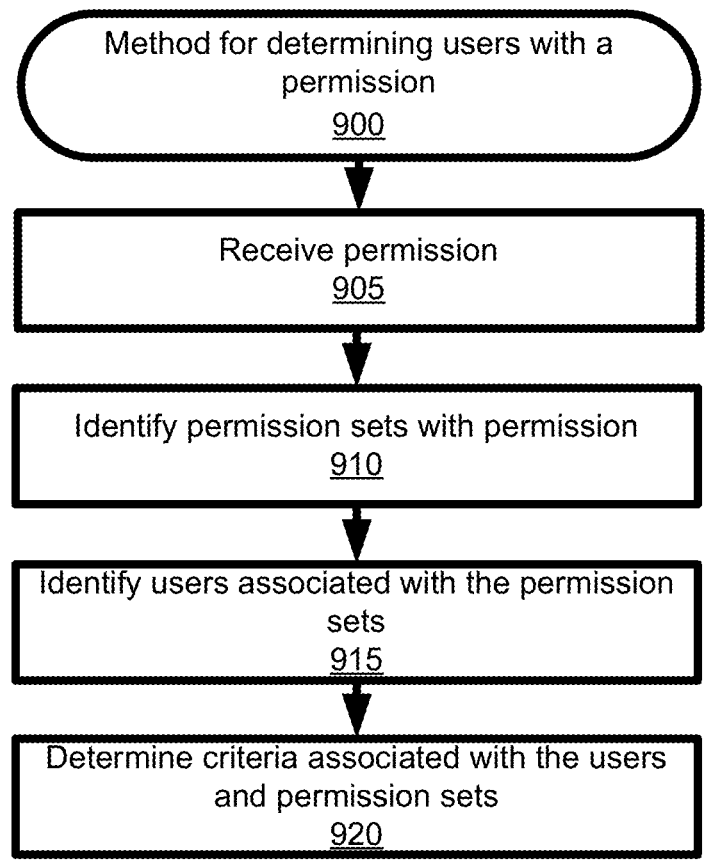
FIG. 9 shows a flowchart of an example of a computer implemented method 900 for determining users with a permission in accordance with some implementations.

In some scenarios, a system administrator may desire to receive information on which users have been assigned permissions and why the user may have the assigned permission. FIG. 9 shows a flowchart of an example of a method 900 for determining users with a permission in accordance with some implementations.

In block 905, a permission may be received, for example, by permission server 405 in FIG. 4. As previously discussed, the permission may include an indication of access, and/or type of access, to a particular component or feature of a system. For example, the permission may be a "view all data" permission which allows a user to view data of all records of a system. In some implementations, multiple permissions may be received.

In block 910, permission sets associated with the permissions may be identified. For example, as in FIG. 6, permission sets 605 and 610 are associated with permission 6 (i.e., permission 6 is included in permission sets 605 and 610). Accordingly, the received permission is found in two permission sets.

In block 915, users associated with the permission sets are identified. For example, users may be identified from the permission set assignment object, as previously discussed. Additionally, in block 920, criteria may be determined, and therefore provide reasons why the user may have access to the particular permissions. For example, if a permission set is associated with "engineer" then the user is determined to have access to permission 6 because the user is an engineer. As another example, a permission set may be associated with "California," and thus the user may be assigned the permission because they are located in California. Accordingly, which users have a permission, and why they have the permission may be determined.

Figure 10:
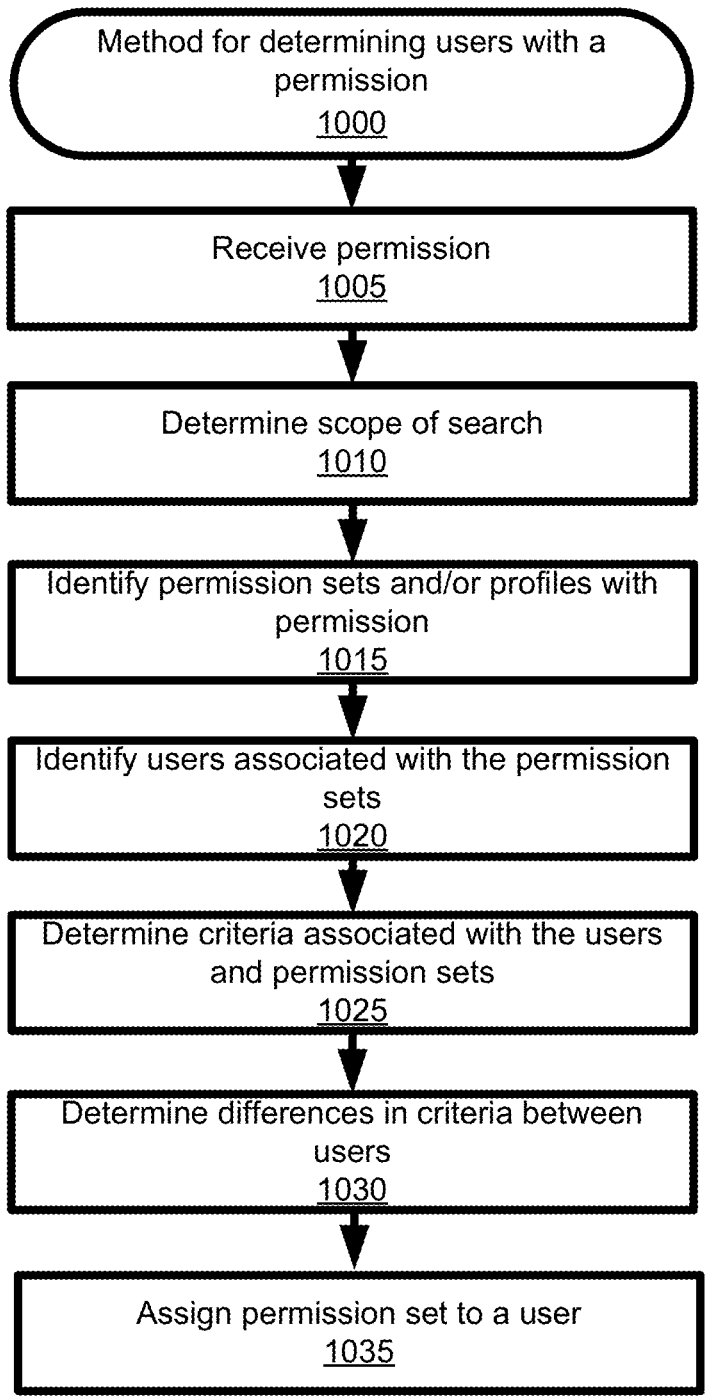
FIG. 10 shows a flowchart of an example of a computer implemented method 1000 for determining users with a permission as well as assigning permissions to users in accordance with some implementations.

FIG. 10 shows a flowchart of an example of a method 1000 for determining users with a permission as well as assigning permissions to users in accordance with some implementations.

In block 1005, a permission may be received, as previously discussed with respect to FIG. 9. In block 1010, a scope of a search may be received or determined. As previously discussed, permissions may be associated with permission sets and/or profiles. Accordingly, permission server 405 may receive an indication whether to search only profiles, permission sets, or both profiles and permission sets.

In block 1015, permission sets and/or profiles with the permission are identified. In block 1020, users associated with the permission sets and/or profiles may be identified, as previously discussed with respect to block 915. In block 1025, criteria associated with the users and permission sets are identified, as discussed with respect to block 920.

In block 1030, differences in the criteria of the users may be determined. In some implementations, two users may share a permission, such as read all data for all records. However, the users may have access to other types of permissions. For example, one user may have a permission allowing the ability to delete all data for all records. However, the second user may not have the same permission. Accordingly, the two users share one permission, but the overall permissions assigned to the users are not the same.

In block 1035, the missing permission may be assigned to the second user. In some implementations, the permission set associated with the permission for the first user may also be assigned to the second user. As such, both users may be "level set," or have the same permissions. In an implementation, another permission set with the same permission may be assigned to the second user.

Figure 11:
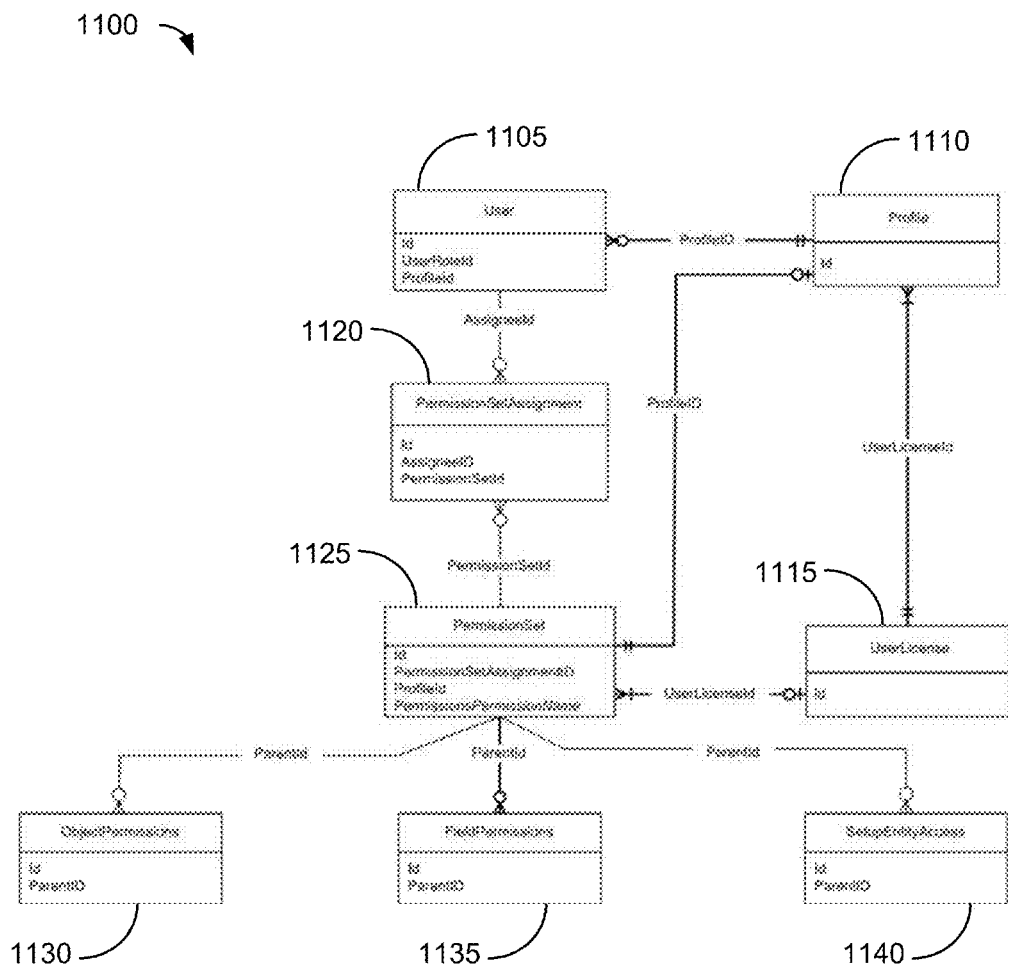
FIG. 11 shows an example of an entity relationship diagram 1100 for permission set assignments in accordance with some implementations.

FIG. 11 shows an example of an entity relationship diagram 1100 for permission set assignments in accordance with some implementations. In FIG. 11, user entity 1105 includes an identifier, user role identifier (e.g., a user role in an organization or level of hierarchy within the organization), and profile identifier. Each user entity 1105 may be associated with one profile entity 1110. However, each profile entity 1110 may be assigned to zero or more users.

Profile entity 1110 may be associated with a user license entity 1115. User license entity 1115 may be associated with one or more profile entities. In some implementations, user license entity 1115 may include an identifier. Moreover, user license entity 1115 may be associated with one or more permission set entities 1125. Profile entity 1120 may also be associated with a permission set entity 1125.

User entity 1105 may be associated with zero or more permission set assignment entities 1120. In FIG. 11, permission set assignment entity 1120 includes an identifier, an assignee or user identifier, and a permission set identifier. Accordingly, a permission set assignment object may include a user's identifier and an identifier associated with a permission set. In some implementations, every assignment of permission sets to a user may include a permission set assignment object.

Permission set entity 1125 includes an identifier, a permission set assignment identifier for an object of the permission set assignment entity 1125, a profile identifier, and the permissions within the permission set. Each permission set entity 1125 may be associated with zero or more types of permissions. For example, in the entity relationship diagram 1100 of FIG. 11, permission set entity 1125 may be associated with zero or more object permissions entity 1130, field permissions entity 1135, and setup entity access entity 1140.

In some implementations, object permissions entity 1130 may determine a permission set's CRUD (i.e., create, read, update, and delete) permissions. Field permissions entity 1135 may determine a permission set's field level security permissions. Setup entity access 1140 may determine a permission set's access to pages (e.g., apex pages), classes, and services. Accordingly, permissions may include a variety of entities used by a system such as objects, fields, applications, or system wide permissions.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

While the disclosed examples are often described herein with reference to an implementation in which an on-demand database service environment is implemented in a system having an application server providing a front end for an on-demand database service capable of supporting multiple tenants, the present implementations are not limited to multi-tenant databases nor deployment on application servers. Implementations may be practiced using other database architectures, i.e., ORACLE®, DB2® by IBM and the like without departing from the scope of the implementations claimed.

It should be understood that some of the disclosed implementations can be embodied in the form of control logic using hardware and/or using computer software in a modular or integrated manner. Other ways and/or methods are possible using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A computer implemented method for providing permissions to users of a database system, the method comprising:
   receiving, at a server associated with the database system, criteria;
   selecting, using the server, a first permission set and a second permission set, each of the first and second permission sets being defined by a respective grouping of permissions indicating accessibility of a component of a system, the first and second permission sets associated with at least one of the criteria, the permissions and the permission sets stored as data objects in the database system;
   identifying, using the server, one or more of the users as being associated with the at least one criteria;
   determining, using the server, that a first count of permissions in the first permission set is lower than a second count of permissions in the second permission set;
   assigning the first permission set to the one or more users responsive to the determination that the first count of permissions in the first permission set is lower than the second count of permissions in the second permission set; and
   storing or updating a data object indicating the assignment of the first permission set in the database system.

2. The method of claim 1, wherein the criteria include one or more of: a geographic location, a level within an organizational hierarchy, an industry, and a role.

3. The method of claim 1, wherein the criteria include one or more permissions.

4. The method of claim 1, further comprising:
   determining that the identified one or more users does not exceed a maximum user limit associated with the permission set.

5. The method of claim 1, further comprising:
   generating an audit trail associated with the assignment of the permission set.

6. The method of claim 1, wherein assigning the permission set includes creating a permission set assignment object.

7. The method of claim 6, wherein the stored data includes the permission set assignment object.

8. The method of claim 6, wherein the permission set assignment object includes a user identifier and a permission set identifier.

9. The method of claim 1, wherein the selected permission set is one of a plurality of permission sets, the selected permission set including a plurality of permissions.

10. The method of claim 9, wherein the permissions include one or more entities used by the service environment, wherein the one or more entities include one or more of: objects, fields, applications, and system wide permissions.

11. The method of claim 1, wherein the server receives the criteria through an application programming interface (API).

12. The method of claim 1, wherein the component of the system is a field of a record stored within a database.

13. The method of claim 1, wherein the component of the system is an object.

14. The method of claim 1, wherein the selected permission set is one of a plurality of permission sets, the selected permission set assigned to a lowest number of users.

15. One or more computing devices for providing permissions to users of a database system, the one or more computing devices comprising:
   one or more processors operable to execute one or more instructions to:
   receive criteria;
   select a first permission set and a second permission set, each of the first and second permission sets being defined by a respective grouping of permissions indicating accessibility of a component of the database system, the first and second permission sets associated with at least one of the criteria, the permissions and the permission sets stored as data objects in the database system;
   identify one or more of the users as being associated with the at least one criteria;
   determine that a first count of permissions in the first permission set is lower than a second count of permissions in the second permission set;
   assign the first permission set to the one or more users responsive to the determination that the first count of permissions in the first permission set is lower than the second count of permissions in the second permission set; and
   store or update a data object indicating the assignment of the first permission set on one or more storage mediums in the database system.

16. A non-transitory computer-readable storage medium storing instructions executable by a computing device to perform a method for providing permissions to users of a database system, the method comprising:
   receiving criteria;
   selecting a first permission set and a second permission set, each of the first and second permission sets being defined by a respective grouping of permissions indicating accessibility of a component of a system, the first and second permission sets associated with at least one of the criteria, the permissions and the permission sets stored as data objects in the database system;
   identifying one or more of the users as being associated with the at least one criteria;
   determining that a first count of permissions in the first permission set is lower than a second count of permissions in the second permission set;
   assigning the first permission set to the one or more users responsive to the determination that the first count of permissions in the first permission set is lower than the second count of permissions in the second permission set; and
   storing or updating a data object indicating the assignment of the first permission set in the database system.

* * * * *